(12) United States Patent
Karlsson (10) Patent No.: US 11,103,931 B2
(45) Date of Patent: Aug. 31, 2021

(54) BORING TOOL (71) Applicant: SANDVIK INTELLECTUAL PROPERTY AB, Sandviken (SE)

(72) Inventor: Robin Karlsson, Gavle (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 0 days.

(21) Appl. No.: 16/086,826

(22) PCT Filed: Jan. 31, 2017

(86) PCT No.: PCT/EP2017/051973
§ 371 (c)(1),
(2) Date: Sep. 20, 2018

(87) PCT Pub. No.: WO2017/162355
PCT Pub. Date: Sep. 28, 2017

(65) Prior Publication Data
US 2019/0118267 A1    Apr. 25, 2019

(30) Foreign Application Priority Data

Mar. 24, 2016  (EP) .................................... 16162248

(51) Int. Cl.
*B23B 29/034*        (2006.01)
(52) U.S. Cl.
CPC .. *B23B 29/03439* (2013.01); *B23B 2260/062* (2013.01)
(58) Field of Classification Search
CPC ....... B23B 29/02; B23B 29/03; B23B 29/034; B23B 29/0341; B23B 29/03439;
(Continued)

(56) References Cited

U.S. PATENT DOCUMENTS 3,845,532 A * 11/1974 Smith .................... B23Q 39/02
                                                        29/40
4,486,130 A * 12/1984 Lipp ................. B23B 29/03457
                                                       408/147
(Continued)

FOREIGN PATENT DOCUMENTS

CH         351015 A    12/1960
EP       2095897 A2    12/2010
(Continued)

OTHER PUBLICATIONS

JP 3252996 English Translation (Year: 1996).*

*Primary Examiner* — Alan Snyder
*Assistant Examiner* — Yasir A Diab
(74) *Attorney, Agent, or Firm* — Corinne R. Gorski (57) ABSTRACT

A boring tool includes a tool body rotatable around a central rotation axis. A slider member is arranged movably inside the tool body along a path extending transversely to the rotation axis. An insert pocket is associated with the slider member to move therewith and configured to receive a cutting insert with a cutting edge and which projects from the tool body transversely to the rotation axis. A motor member is connected to the slider member and controllable to move the slider member transversely to the rotation axis for changing the distance of the cutting edge to the rotation axis. The motor member is arranged inside the tool body together with the slider member in a cutting part of the tool body at a front end thereof. The motor member is arranged in parallel with the transversal extension of the slider member along said path.

7 Claims, 5 Drawing Sheets

(58) Field of Classification Search
CPC ......... B23B 29/03425; B23B 2260/062; Y10T 408/04; Y10T 408/08; Y10T 408/5584; Y10T 408/85
See application file for complete search history.

(56) References Cited

U.S. PATENT DOCUMENTS

| | | | | |
|---|---|---|---|---|
| 4,489,629 A * | 12/1984 | D'Andrea | ......... | B23B 29/03439 483/32 |
| 4,552,493 A * | 11/1985 | Schultshick | ......... | G05B 19/404 408/13 |
| 5,251,511 A * | 10/1993 | Muendlein | ........ | B23B 29/03403 408/152 |
| 5,427,480 A * | 6/1995 | Stephens | ........... | B23B 29/03457 408/156 |
| 5,909,986 A * | 6/1999 | Kaiser | ............... | B23B 29/03492 408/143 |
| 6,053,082 A | 4/2000 | Rupp et al. | | |
| 6,312,200 B1 * | 11/2001 | Graham | ............ | B23B 29/03446 408/1 R |
| 6,367,359 B1 | 4/2002 | Ropos | | |
| 7,029,209 B2 * | 4/2006 | Cardemon | ........ | B23B 29/03403 408/1 R |
| 7,140,819 B2 * | 11/2006 | Broghammer | .... | B23B 29/03421 409/234 |
| 8,684,638 B2 * | 4/2014 | Buck | ................. | B23B 29/03407 408/16 |
| 9,849,518 B2 * | 12/2017 | Da Silva | ........... | B23B 29/03417 |
| 2003/0002939 A1 * | 1/2003 | Tugend | ............... | B23B 29/0341 408/181 |
| 2007/0297866 A1 * | 12/2007 | Bassett | .............. | B23Q 17/2225 408/16 |
| 2009/0279963 A1 * | 11/2009 | D'Andrea | ......... | B23B 29/03407 407/45 |
| 2010/0145496 A1 * | 6/2010 | Tang | ...................... | B23Q 17/00 700/174 |
| 2011/0116880 A1 * | 5/2011 | Nakamura | ........ | B23B 29/03421 408/1 R |
| 2012/0058871 A1 | 3/2012 | Nakamura et al. | | |
| 2012/0148354 A1 * | 6/2012 | Vedel | ................ | B23B 29/0346 408/3 |
| 2012/0269590 A1 * | 10/2012 | Buck | ................ | B23B 29/03407 408/16 |
| 2013/0294855 A1 * | 11/2013 | Freyermuth | ........ | B23B 29/0341 408/18 |

FOREIGN PATENT DOCUMENTS

JP         H08155705 A       6/1996
JP           3252996 B2       2/2002

\* cited by examiner

BORING TOOL

RELATED APPLICATION DATA

This application is a § 371 National Stage Application of PCT International Application No. PCT/EP2017/051973 filed Jan. 31, 2017 claiming priority to EP 16162248.5 filed Mar. 24, 2016.

TECHNICAL FIELD OF THE INVENTION

The present invention relates to a boring tool comprising a tool body including a front end and a rear end, between which a central rotation axis extends around which the tool body is rotatable in a direction of rotation,
a slider member which is arranged movably inside the tool body along a path extending transversely to said rotation axis,
an insert pocket associated with the slider member to move therewith and configured to receive a cutting insert to be se-cured therein by a fastening member, which cutting insert has a cutting edge and projects from the tool body transversely to said rotation axis,
a motor member connected to the slider member and controllable to move the slider member transversely to said rotation axis for changing the distance of the cutting edge of the cutting insert to said rotation axis and by that the radius to be created in a hole of a workpiece when bored by rotation of the tool body, and
a control unit configured to control the motor member to move the slider member.

Such a boring tool is used for carrying out the machining process of enlarging an already existing hole by means of rotating a tool body provided with one or more cutting inserts. The process is commonly performed in order to achieve accurate dimensions, tight tolerances or a certain surface finish. Typical boring tool bodies are often supplied with a radially adjustable cutting edge that enables a variable cutting diameter as well as the possibility to compensate for wear of the cutting insert.

BACKGROUND

Traditionally, the adjustment of the diameter of the hole to be obtained by the boring action is done manually by the machine operator, through e.g. turning an adjustment screw on the tool body. In an environment where productivity is paramount, the manual adjustment procedure for boring tools is considered time consuming and accordingly undesirable. Such an adjustment demands an operator to physically stop the machining operation and contact the boring tool.

It has for that sake been suggested to adjust said diameter by providing the boring tool with a motor member controllable to move the slider member transversely to the rotation axis of the tool body for changing the distance of the cutting edge of the cutting insert to this rotation axis. "Transversely" is here not to be interpreted as "perpendicularly", although that would in most cases be preferred, but a movability in a direction changing the distance of the cutting edge of the cutting insert to the rotation axis and by that the radius to be created in a hole of a work piece when bored by rotation of the tool body. Providing the boring tool with such a motor member eliminates the need for operators to physically reach into the machine or remove the boring tool from the machine to adjust the tool diameter. This means that the adjustment procedure for a boring tool is considerably faster, more robust and more secure.

BACKGROUND ART

EP 2 095 897 B1 discloses a boring tool of the type defined in the introduction. The arrangement of the motor member in this tool makes it possible to move a cutting insert thereof transversely to the rotation axis of the tool body for carrying out corrections for wear of the cutting insert but not for carrying out any substantial adjustment of the radius to be created in a hole of a work piece when bored by rotation of the tool body.

SUMMARY OF THE INVENTION

The object of the present invention is to provide a boring tool of the type defined in the introduction being improved in at least some aspect with respect to such boring tools already known.

This object is according to the invention obtained by providing such a boring tool with a tool body including a front end and a rear end, between which a central rotation axis extends around which the tool body is rotatable in a direction of rotation, a slider member which is arranged movably inside the tool body along a path extending transversely to said rotation axis, an insert pocket associated with the slider member to move therewith and configured to receive a cutting insert to be se-cured therein by a fastening member, which cutting insert has a cutting edge and projects from the tool body transversely to said rotation axis, a motor member connected to the slider member and controllable to move the slider member transversely to the rotation axis for changing the distance of the cutting edge of the cutting insert to said rotation axis and by that the radius to be created in a hole of a workpiece when bored by rotation of the tool body, and a control unit configured to control the motor member to move the slider member.

By arranging the motor member inside the tool body together with the slider member in a cutting part of the tool body at the front end of the tool body and in parallel with the transversal extension of the slider member along said path the arrangement of the motor member and slider member inside the tool body may be very compact while still providing for a possibility of substantial adjustments of the radius to be created in a hole of a work piece when bored by rotation of the tool body. That the motor member is arranged in parallel with said transversal extension means here along and beside this transversal extension and the motor may also have parts coinciding with said path, for instance by an arrangement of the motor member coaxially with respect to a theoretical axis defining said path. Such an arrangement of the motor member with respect to the slider member enables considerable movements of the slider member along said path in spite of the fact that the motor member is arranged inside the tool body and in the cutting part of the tool body.

According to an embodiment of the invention the slider member is movable by action of the motor member along said path between two end positions corresponding to a said boring radius at the outermost end position exceeding the boring radius at the innermost end position by at least 10%, 10%-60%, 20%-50% or 30%-50%. By providing the possibility to make adjustments of a radius to be created in a hole of a work piece when bored by rotation of the tool body by at least 10% the same boring tool with the same tool body may be used for providing holes with substantially different diameters which makes it possible to save time and by that costs with respect to a need of changing boring tool and/or tool body for each change of diameter of holes to be bored. An adjustability of said boring radius by more than 60% would result in a need of complicated transmissions and/or designs of members connecting the motor member to the slider member making the boring tool less simple and robust.

According to an embodiment of the invention the control unit comprises a micro controller arranged inside the tool body in said cutting part thereof. The arrangement of the control unit in the cutting part contributes to make the system for obtaining adjustment of the radius to be created in a hole of a workpiece when bored by rotation of the tool body compact.

According to an embodiment of the invention the micro controller is configured to communicate with a device located externally of the tool body so as to receive set values of boring diameters to be achieved by rotation of the tool body and to control the motor member to move the slider member to positions corresponding thereto. This makes it easy and comfortable to carry out said adjustments by sending orders from said device to the micro controller located inside the tool body through an operator or even automatically through suitable software.

According to an embodiment of the invention the microcontroller is configured to communicate with a said device by wireless communication. Such communication means may for instance use the Low Energy (LE) Bluetooth protocol for transmission of data from said device to the micro controller. The device may for instance be a PC, a smartphone or a tablet. The wireless communication means facilitates the handling of the boring tool, since no cables connecting a said device with the interior of the tool body have to be considered.

According to an embodiment of the invention the boring tool comprises an energy storing member, such as an electric battery, arranged inside the tool body and connected to provide electric energy to the function of the micro controller and the motor. This feature means that no cables from an external source of electric power have to be connected to the interior of the tool body, which makes the handling of the boring tool less complicated. According to an embodiment of the invention the boring tool further comprises a sensor arranged inside the tool body and configured to sense the position of the slider member with respect to a fixed part of the tool body giving evidence of the position of said slider member along said path and send information about the position sensed to the control unit, and the control unit is configured to compare the value of the position sensed with a position value to be obtained for a boring radius to be set and control the motor member to move the slider member so as to obtain correspondence of these two position values. This enables obtention of high resolutions of adjustments of the radius to be created in a hole of a workpiece when bored by a rotation of the tool body, such as in the order of 0.5 µm or even finer. Thus, having such a sensor measuring the actual position of the slider member along said path enables an increased authenticity and in some cases also an increased accuracy with respect to measuring arrangements being based on measuring the number of turns made by a motor axis causing movement of the slider member.

According to an embodiment of the invention the motor member is configured to drive a member thereof to rotate or to carry out a linear translation movement so as to move the slider member. These are suitable ways of operation of the motor member.

According to an embodiment of the invention the motor member is configured to cause movement of the slider member by rotating a threaded member in engagement with a thread of the slider member, of a member arranged to move with the slider member or of a member fixed with respect to the tool body. Such a design of members for obtaining a transmission of movement from the motor member to the slider member will result in a high accuracy by simple means.

According to an embodiment of the invention the slider member is hollow and the motor member is arranged inside the slider member, which results in a very compact combination of slider member and motor member requiring little space inside the cutting part of the tool body while still obtaining a possibility to carry out big adjustments.

According to an embodiment of the invention the motor member is arranged inside a hollow screw with an external thread in engagement with an inner thread of a member fixed to the slider member, and the motor member is configured to rotate said screw so as to move this and by that the slider member along said path. This constitutes a simple way of realizing a compact arrangement of the motor member and the slider member while providing for said big adjustments.

According to an embodiment of the invention the motor member is arranged beside the slider member within an enlarged perimeter around the slider member. This constitutes another possibility to obtain a compact design of the combination of motor member and slider member inside the tool body and still a possibility to obtain said big adjustments.

According to an embodiment of the invention the motor member is configured to drive a part thereof to rotate around a rotation axis extending in parallel with said path. Such an arrangement of the motor member makes it easy to transmit movements from movable parts thereof to the slider member, which may through an embodiment of the invention be obtained by configuring the motor member to rotate a gear in engagement with another gear so as to rotate a threaded member in engagement with another threaded member, in which one of these threaded members is connected to the slider member so as to cause movement of the slider member along said path by rotation of said gears.

Other advantageous features as well as advantages of the present invention appear from the description following below.

BRIEF DESCRIPTION OF THE DRAWINGS

With reference to the appended drawings, below follows a specific description of embodiments of the invention cited as examples.

In the drawings.

DETAILED DESCRIPTION OF EMBODIMENTS OF THE INVENTION

Figure 1:
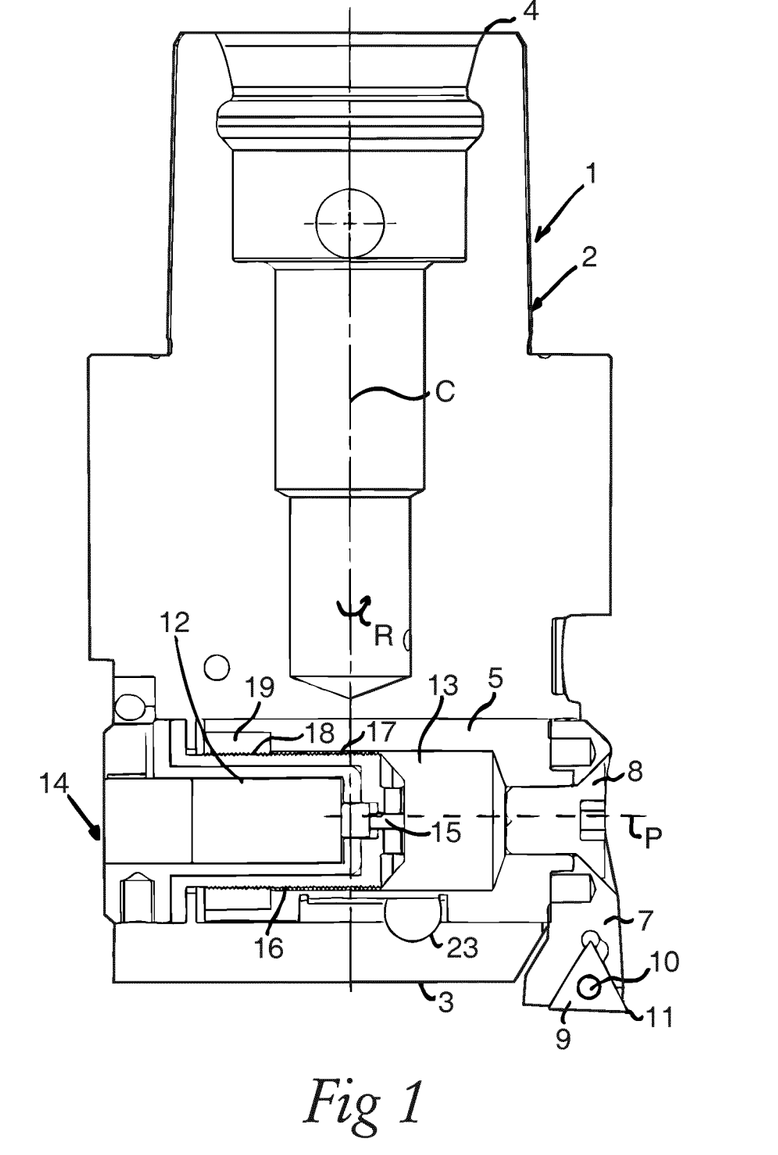
FIG. 1 is a simplified and partially sectioned view of a boring tool according to a first embodiment of the invention with an insert thereof in a position corresponding to a smallest boring radius.
Figure 2:
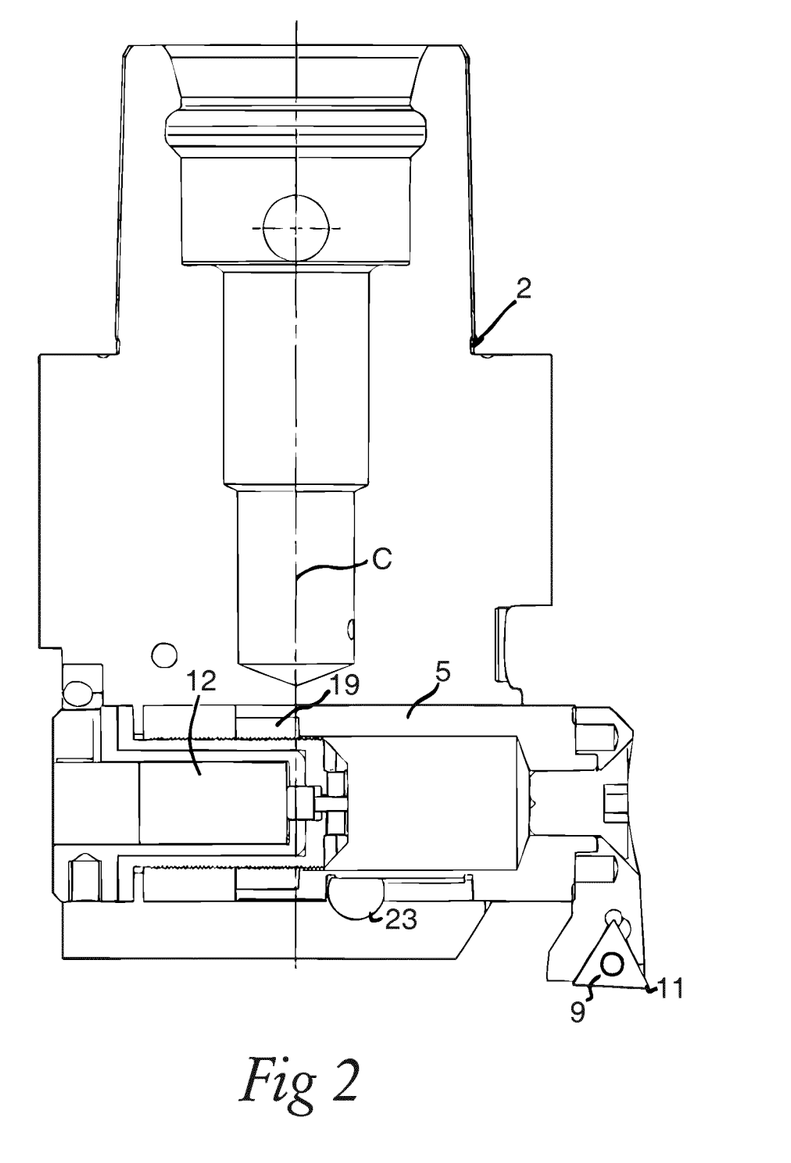
FIG. 2 is a view of the tool shown in FIG. 1 with said insert in a position corresponding to a larger boring radius.
Figure 3:
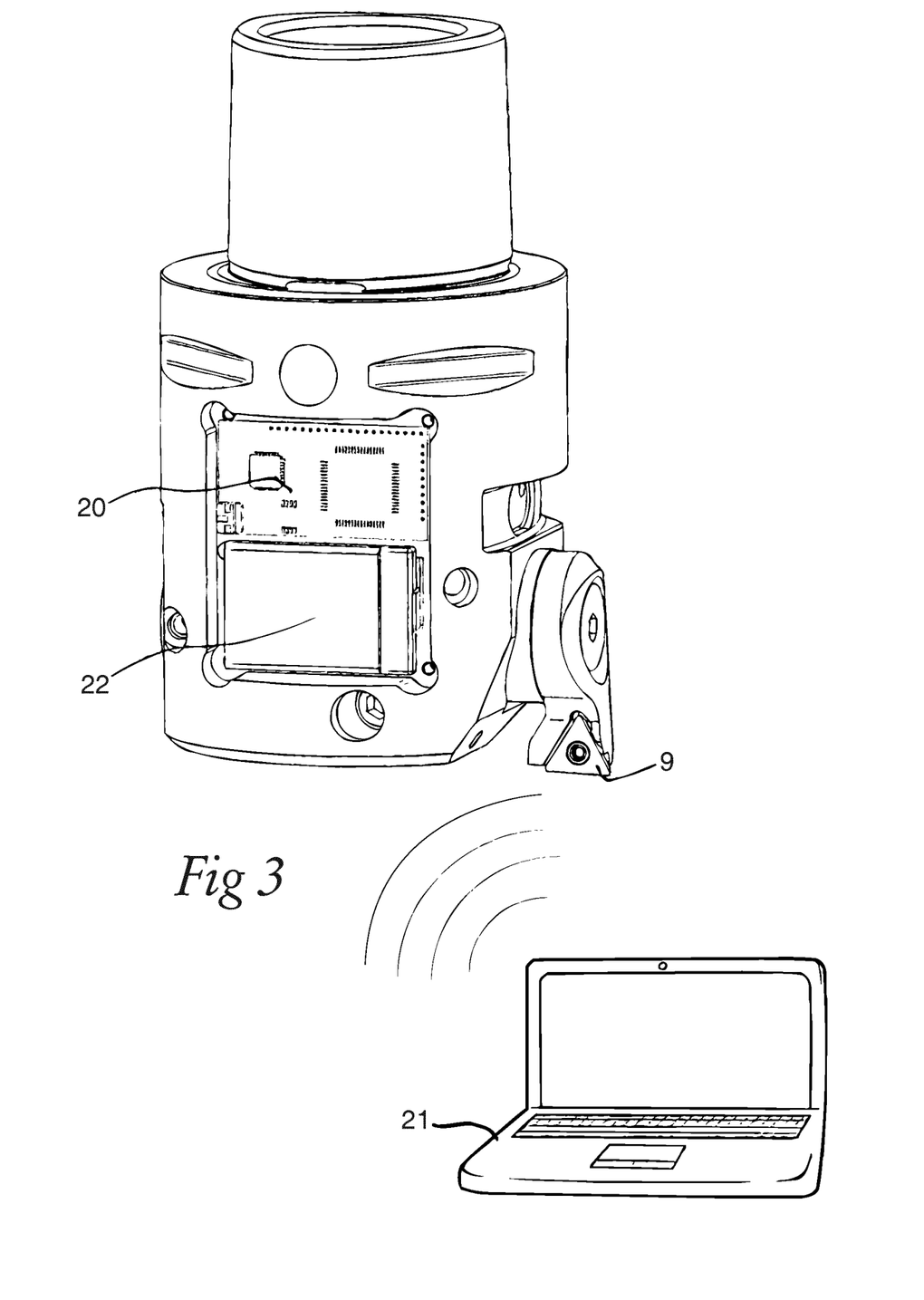
FIG. 3 is a simplified perspective view of the boring tool shown in FIGS. 1 and 2 used to illustrate the operation thereof.

A boring tool 1 according to a first embodiment of the invention is shown in FIG. 1-3 and reference is made in parallel to these figures when now describing the design of the boring tool. The boring tool has a tool body 2 including a front end 3 and a rear end 4, between which a central rotation axis C extends around which the tool body is rotatable in a direction of rotation R. A slider member 5 is arranged movably inside the tool body along a path P (see dashed line in FIG. 1) extending transversely to the rotation axis C while being directed perpendicularly thereto. An insert pocket 6 (see FIG. 3) is associated with the slider member to move therewith by being arranged on a part 7 secured to the slider member 5 by a screw 8. The insert pocket is configured to receive a cutting insert 9 to be secured therein by a fastening member 10. The cutting insert has a cutting edge 11 and projects from the tool body transversely to the rotation axis C thereof so as to carry out a boring action on walls of a hole in a workpiece when rotating the tool body around the rotation axis C.

A motor member 12 in the form of an electric motor is arranged inside the slider member, which is hollow by having a cavity 13, in a cutting part 14 of the tool body at the front end 3 thereof. The motor member 12 is configured to rotate an axle 15 being coaxially arranged with respect to said path P and secured to a hollow screw 16 inside which the motor member 12 is arranged.

The hollow screw 16 has an external thread 17 in engagement with an internal thread 18 of a nut 19 fixed with respect to the slider member 5. Thus, rotation of the hollow screw 16 caused by rotation of the axle 15 by operation of the motor member 12 will cause the slider member 5 to move in a direction transversely to the axis of rotation C of the tool body by the turning of the hollow screw 16 in the nut 19. The distance of the cutting edge 11 of the cutting insert 9 to the rotation axis C and by that the radius to be created in a hole of a workpiece when bored by rotation of the tool body may be adjusted by such movement. FIG. 1 shows an innermost end position of the slider member, while FIG. 2 shows a nearly outermost end position of the slider member resulting in a said radius exceeding the radius of the tool according to FIG. 1 by approximately 25%.

The boring tool also has a control unit in the form of a micro controller 20 arranged inside the tool body in the cutting part 14 thereof, and this micro controller is configured to control the motor member to move the slider member. The micro controller is configured to communicate with the device 21, here a laptop, located externally of the tool body so as to receive set values of boring diameters to be achieved by rotation of the tool body and to control the motor member to move the slider member to positions corresponding thereto. The micro controller 20 is configured to communicate with such an external device, which may also be for example a smartphone or a tablet, by wireless communication means, such as by the Low Energy (LE) Bluetooth protocol. An electric battery 22 is arranged inside the tool body and connected to provide electric energy to the function of the micro controller 20 and the motor member and also a sensor 23 schematically indicated in FIG. 2, arranged inside the tool body and configured to sense the position of the slider member 5 with respect to a fixed part of the tool body giving evidence of the position of the slider member along said path P and send information about the position sensed to the micro controller 20. The micro controller is configured to compare the value of the position sensed with the position value to be obtained for a boring radius to be set in accordance with instructions received from the external device 21 and control the motor member to move the slider member so as to obtain correspondence of these two position values. Integration of such a sensor 23 measuring the actual position of the slider member makes it possible to get high accuracy also for big boring diameter adjustments of the boring tool.

Figure 4:
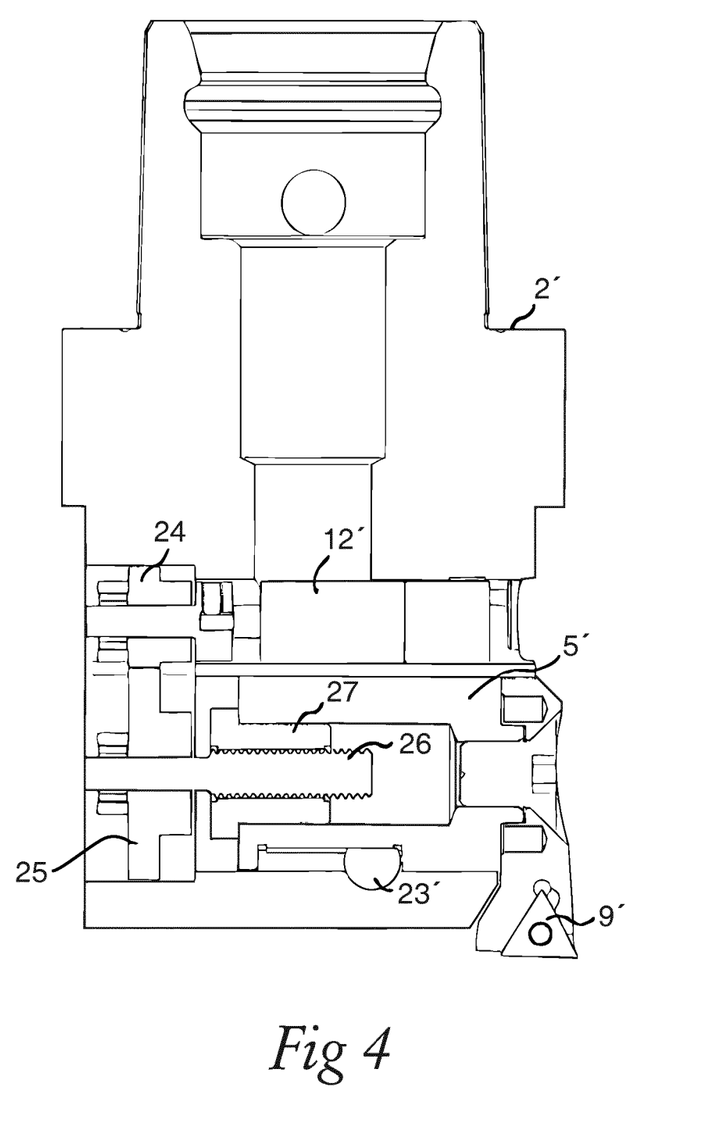
FIG. 4 is a view corresponding to that of FIG. 1 of a boring tool according to a second embodiment of the invention.
Figure 5:
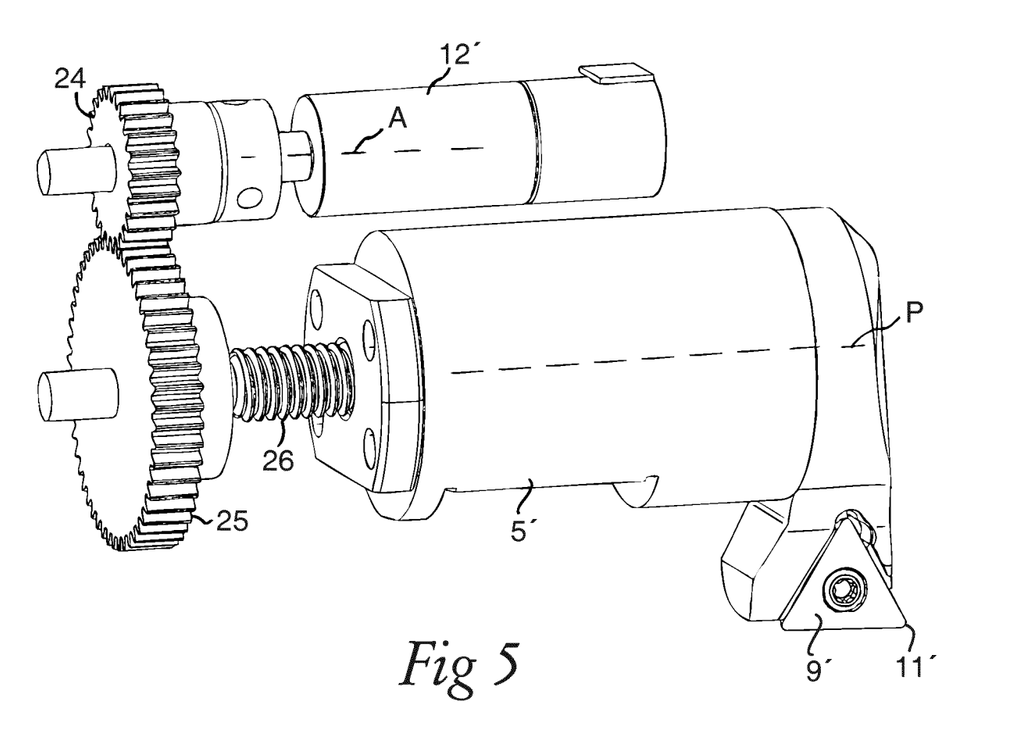
FIG. 5 is an enlarged view of the motor member, the slider member and a transmission acting between these in the embodiment shown in FIG. 4.

FIGS. 4 and 5 illustrate a boring tool according to a second embodiment of the invention, and components of this boring tool having correspondence with components in the first embodiment have been provided with the same reference numerals added with prime. The motor member 12' is in this embodiment arranged beside the slider member 5' within an enlarged perimeter around the slider member and is configured to drive a part thereof in the form of an axle 15' to rotate around a rotation axis A extending in parallel with said path P. The motor member is configured to rotate a gear 24 in engagement with another gear 25 so as to rotate a threaded member in the form of a ball screw 26 in engagement with another threaded member in the form of a ball nut 27, which is fixed with respect to the slider member 5'. Thus, rotation of the ball screw 26 will cause the slider member 5' to move along said path P for changing the distance of the cutting edge 11' of the cutting insert 9' to the rotation axis C of the boring tool and by that the radius to be created in a hole of a workpiece when bored by rotation of the tool body.

The invention is of course not restricted to the embodiments thereof described above, but many possibilities to modifications thereof would be apparent to a person with skill in the art without departing from the scope of the invention as defined in the appended claims.

The motor member is in the embodiments described above a rotational electrical motor, but it may be of any conceivable type, such of a linear translation type.

The invention claimed is:

1. A boring tool comprising:
   a tool body including a front end and a rear end, between which a central rotation axis extends around and which the tool body is rotatable in a direction of rotation;
   a hollow slider member arranged movably inside the tool body along a path extending transversely to said central rotation axis;
   an insert pocket associated with the slider member to move therewith and configured to receive a cutting insert to be secured therein by a fastening member, which cutting insert has a cutting edge that projects from the tool body transversely to said central rotation axis;
   a motor arranged inside a hollow screw having an external thread in engagement with an inner thread of a member fixed to the slider member and controllable to move the slider member transversely to said central rotation axis for changing a distance between the cutting edge of the cutting insert and said central rotation axis and by this distance the radius to be created in a hole of a workpiece when bored by rotation of the tool body, wherein the motor is configured to rotate said screw so as to move the slider member along said path; and
   a control unit configured to control the motor to move the slider member, wherein the motor is arranged inside the tool body together with the slider member in a cutting part of the tool body at said front end, and that the motor is arranged in parallel with said transversal extension of the slider member along said path.

2. The boring tool according to claim 1, wherein the slider member is movable by action of the motor along said path between two end positions corresponding to a boring radius at an outermost end position that exceeds a boring radius at an innermost end position by at least 10%, 10%-60%, 20%-50% or 30%-50%.

3. The boring tool according to claim 1, wherein the control unit includes a micro controller arranged inside the tool body in said cutting part thereof.

4. The boring tool according to claim 3, wherein the micro controller is configured to communicate with a device located externally of the tool body so as to receive set values of boring diameters to be achieved by rotation of the tool body and to control the motor to move the slider member to positions corresponding thereto.

5. The boring tool according to claim 4, wherein the micro controller is configured to communicate with said device by a wireless communication device.

6. The boring tool according to claim 3, further comprising an energy storing member or electric battery, arranged inside the tool body and connected to provide electric energy to the micro controller and the motor.

7. The boring tool according to claim 1, further comprising a sensor arranged inside the tool body and configured to sense a position of the slider member with respect to a fixed part of the tool body giving evidence of the position of said slider member along said path and send information about the position sensed to the control unit, wherein the control unit is configured to compare the value of the position sensed with a position value to be obtained for a boring radius to be set and control the motor to move the slider member so as to obtain correspondence of these two position values.

* * * * *